United States Patent
Hopkins, III

(10) Patent No.: US 8,380,544 B1
(45) Date of Patent: Feb. 19, 2013

(54) SYSTEMS AND METHODS FOR PROVIDING A LEGACY LIFE INSURANCE POLICY BENEFIT TO A BENEFICIARY

(75) Inventor: John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 882 days.

(21) Appl. No.: 12/364,192

(22) Filed: Feb. 2, 2009

(51) Int. Cl.
*G06Q 40/00* (2012.01)

(52) U.S. Cl. .......................................... 705/4

(58) Field of Classification Search ................ 705/4
See application file for complete search history.

(56) References Cited

U.S. PATENT DOCUMENTS

| | | | |
|---|---|---|---|
| 5,754,980 A * | 5/1998 | Anderson et al. ........... | 705/4 |
| 2003/0144888 A1 | 7/2003 | Baron et al. | |
| 2004/0236612 A1 | 11/2004 | Heusinkveld et al. | |
| 2008/0167904 A1 | 7/2008 | Rudich et al. | |
| 2008/0221933 A1 | 9/2008 | Gray | |

OTHER PUBLICATIONS

"Overview of Canadian taxation of life insurance policies", Sun Life Assurance Company of Canada, Jan. 9, 2005, pp. 1-4.

* cited by examiner

*Primary Examiner* — James Vezeris
(74) *Attorney, Agent, or Firm* — Kilpatrick Townsend & Stockton LLP

(57) ABSTRACT

A "legacy life" component to a life insurance policy. An insured may protect his/her descendents by applying for a life insurance policy that provides for subsequent life insurance for the descendents as part of the death benefit provided by the life insurance policy. The "legacy life" policy may have different underwriting procedures in place and/or a lower premium than comparable coverage policies as a portion of the policy death benefit payout would be withheld to fund the descendent life insurance policy. As such, the legacy life insurance policy may produce the subsequent life insurance policy as a fully-funded derivative policy at payout. Because the original policy does not payout the full face value as a cash death benefit, the derivative policy maximizes a float for the insurance provider.

14 Claims, 4 Drawing Sheets

SYSTEMS AND METHODS FOR PROVIDING A LEGACY LIFE INSURANCE POLICY BENEFIT TO A BENEFICIARY

BACKGROUND

Economic difficulties are making it difficult for heads of households to provide for their families. Recently, the savings rate in the United States has dipped below zero, meaning that people are spending more than they are earning. This may present problems in years to come as Americans approaching retirement age may have spent all their money on gadgets instead of preparing for retirement. In addition, many people have not appropriately protected their assets because of poor spending habits. In particular, may individuals do not have adequate life insurance coverage to protect their families should there be a loss of the primary wage earner.

Life insurance is a protection against financial loss resulting from death of an insured. It is an insurance company's promise to pay a beneficiary a specific amount of money when the insured dies in exchange for timely payment of premiums. Life insurance helps replace lost income in the event of an insured's death. The death benefit may be used to replace income the family would need to maintain their standard of living after the death of a wage earner. The death benefit may also be used to pay off a mortgage loan and other personal and business debts, to create a fund for children's education, to pay final expenses, such as funeral costs and taxes, or to create a family emergency fund or a fund for a family member with special needs. However, there is not an option to provide for future life insurance protection for beneficiaries, which may be used to protect future generations from a loss of income and provide long-term financial stability.

SUMMARY

Systems and methods for providing a "legacy life" component to a life insurance policy. An insured may protect his/her descendents by applying for a life insurance policy that provides for subsequent life insurance for the descendents as part of the death benefit provided by the life insurance policy. The "legacy life" policy may have different underwriting procedures in place and/or a lower premium than comparable coverage policies as a portion of the policy death benefit payout would be withheld to fund the descendent life insurance policy. As such, the legacy life insurance policy may produce the subsequent life insurance policy as a fully-funded derivative policy at payout. Because the original policy does not payout the full face value as a cash death benefit, the derivative policy maximizes a float for the insurance provider.

In some implementations, plural subsequent policies may be made part of a death benefit associated with the legacy life policy. Each of the plural subsequent life insurance policies may be fully funded by the death benefit associated with the legacy life policy.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing, as well as the following detailed description, is better understood when read in conjunction with the appended drawings. For the purpose of illustrating the claimed subject matter, there is shown in the drawings example constructions of various implementations; however, the implementations are not limited to the specific methods and instrumentalities disclosed. In the drawings:

DETAILED DESCRIPTION

Figure 1:
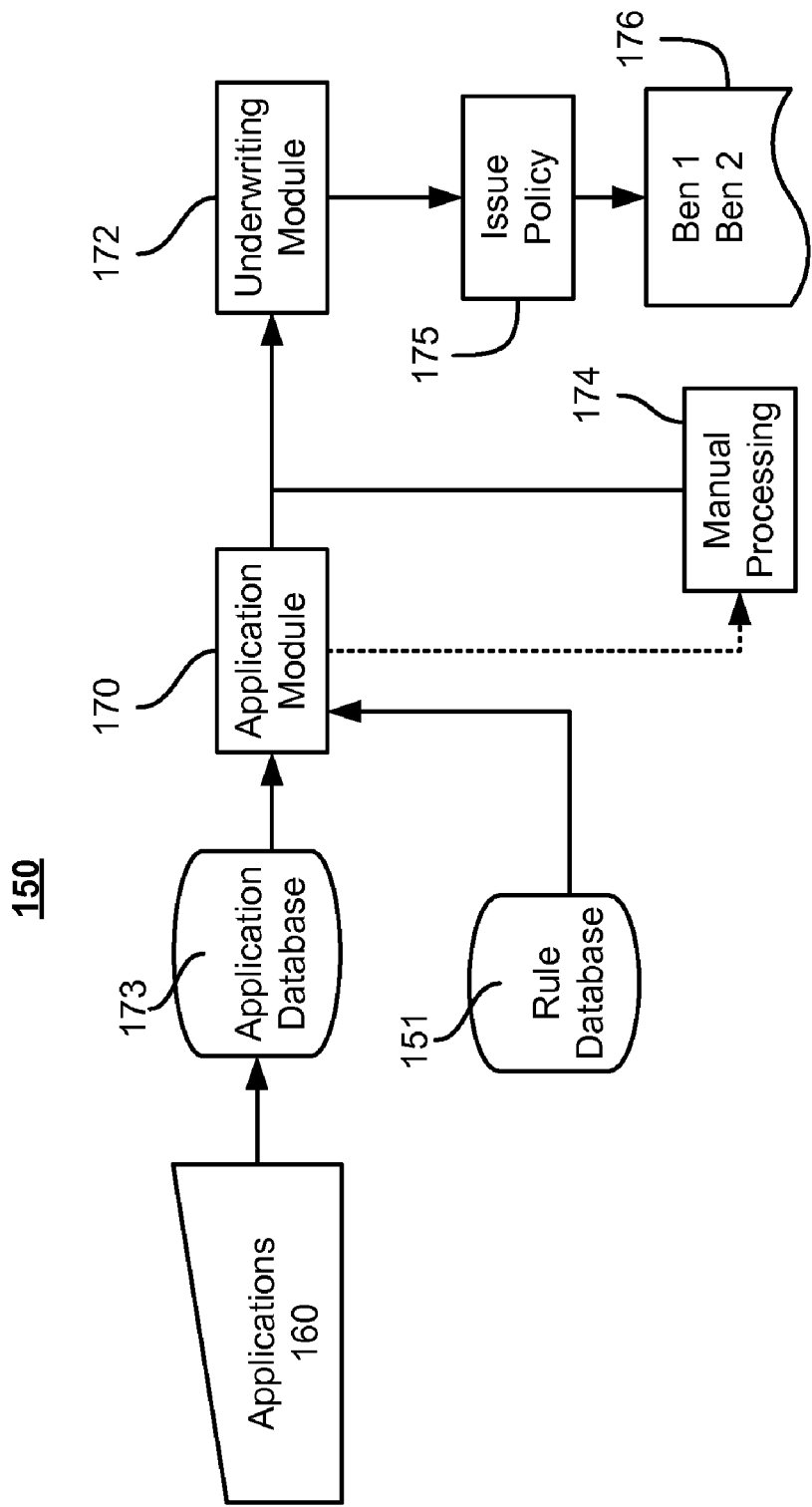
FIG. 1 represents an example system that may be implemented by an insurance provider for receiving and processing a life insurance application.

FIG. 1 represents an example system 150 that may be implemented by an insurance provider for receiving and processing a life insurance application. As shown it FIG. 1, an application 160 for life insurance may be received by the life insurance provider. The application may be made by an individual seeking life insurance coverage in accordance with contract terms offered by the life insurance providers. An application database 173 may also be in operative communication with, for example, an application module 170. The application module 170 may be any combination of software and/or hardware that is able to process the life insurance application on behalf of the life insurance carrier.

For example, the application module 170 may be a special or general use computer program operating on a computer system. Such a computer program may be, for example, a general use program (e.g., a spreadsheet, database, or the like) that has been adapted for processing life insurance applications, a specially-written program for processing life insurance applications, a life insurance industry-specific program that has been adopted for a particular life insurance carrier or the like. The computer system itself may be either a special use computer or a general use computer such as, for example, a desktop computer, workstation, etc.

A rules database 151 may also be in operative communication with life insurance application module 170. The rules database 151 may include any type or number of life insurance rules that may affect a life insurance policy applicant's ability to be approved for a policy. Rules may include, but are not limited to, health or behavioral characteristics that may be taken into account by the life insurance carrier during the life insurance policy approval process. For example, a non-exhaustive list of such characteristics that may be addressed by the stored rules may include: the applicant's tobacco use, aviation activity, avocation, foreign travel, driving history, height and weight, central nervous system condition, respiratory system condition, circulatory system condition, gastrointestinal system condition, urinary system condition, endocrine system condition, muscle, bone, and skin condition, cancer status, reproductive system condition, blood and lymph system condition, recent physical examinations, medical consultations, prescription medications, human immunodeficiency virus and acquired immune deficiency syndrome status, medical diagnostic testing, prior applications for insurance, substance abuse, and genetic propensities.

The application module 170 may receive a particular life insurance applicant's application data from the application database 173. The application module 170 may be in operative communication with the application database 173 either as part of the application module 170 (e.g., the application database 173 may be stored in, and/or accessed within the application module 170), or may be stored remotely and accessed as necessary by the application module 170.

The application database 173 may include one or more life insurance applications that are stored in electronic form, and the application module 170 may access the application database 173 when directed—either automatically or manually—to process a particular applicant's life insurance application. A manual processing 174 element represents processing that may take place for all or part of an applicant's life insurance application. Components of an applicant's application may not be capable of being resolved by way of processing by the application module 170, and thus may be sent to a human underwriter for manual processing.

An underwriting module 172 represents a process (either automatic or manual) for issuing a policy once it has been approved by the application module 170 or manual processing 174. For example, the application module 170 may approve an applicant's life insurance application automatically if all of the applicant's responses to items within the life insurance application are within predetermined tolerances or within ranges determined by the rules database 151. Such an application where application answers all fall within predetermined thresholds indicates a life insurance applicant who may present an acceptable risk to a life insurance carrier. Thus, the application module 170 may send such an applicant's life insurance application directly to underwriting module 172 for issuance as a policy 175. In other instances where application answers may be outside predetermined thresholds, as set by the rules database 151, manual processing 174 may resolve such inconsistencies or offer a policy having higher premiums based on the variances of the applicant's answers from the thresholds. In other instances, the application may be denied.

The policy may indicate one or more beneficiaries 176, who may receive a payment as a death benefit during the contract period. For example, in a conventional term life insurance policy, the beneficiaries may receive a specified death benefit during the contract term (e.g., 40 years). As shown in Table 1, a $100,000 term life insurance policy may pay beneficiaries 1 and 2 each $50,000 during contract period in the event of the dead of the insured. The monthly premium is $66.36.

In some implementations, a legacy life insurance policy may be offered by the insurance provider. For example, as show in Table 1, the legacy life insurance policy may offer a $100,000 benefit with a monthly premium of $59.59. The legacy life insurance policy may provide beneficiary 1 with a conventional $50,000 cash payment and may provide a ½ cash value payment of $25,000 to beneficiary 2 together with a $25,000 life insurance policy. Here, the insured may receive a lower premium amount because a portion of the original policy remains with the insurance provider to fund a subsequent life insurance policy for beneficiary 2.

Any combination of benefits, up to the contracted amount may be specified, e.g., all beneficiaries receive a partial cash payment and a life insurance policy as the death benefit, or some number of beneficiaries may receive a partial cash payment and a life insurance policy as the death benefit and others receive a full cash payment. The premium amount may be adjusted based on the combination of full cash payment beneficiaries to partial cash payment/life insurance beneficiaries. Further, while only two beneficiaries are shown, any number of beneficiaries may be specified under the insurance policy.

TABLE 1

| Policy | Premium | Beneficiary 1 | Beneficiary 2 |
|---|---|---|---|
| Term $100,000 | $66.36 | $50,000 | $50,000 |
| Legacy $100,000 | $59.59 | $50,000 | 1/2 Cash Value + $25,000 Life Insurance Policy |

Table 2 shows an example comparison of the profits associated with a conventional term life insurance product and a legacy life insurance product. As shown, because of the lower premium associated with the legacy life insurance product, revenue, interest accrued and total revenue for the legacy life insurance product is less than the conventional term life insurance product for the insurance provider. This also reduces the net profit amount to the life insurance provider. However, with the legacy life insurance product, the cash payout to the beneficiaries is reduced and a portion of the death benefit is reinvested into a subsequent life insurance product. In some implementations, the death benefit may include an annuity payable to the beneficiary.

Because of this reinvestment into a subsequent insurance product, there is a profit amount associated with the subsequent life insurance product for beneficiaries 1 and/or 2 that is not part of the conventional term life insurance product. Over the contract period of the subsequent life insurance product for beneficiaries 1 and/or 2, the insurance provide may realize larger total profit, as shown the last column in Table 2.

TABLE 2

| Policy | Revenue | Interest Accrued | Total Revenue | Beneficiary Payout | Net Profit | Profit from Ben 1 & Ben 2 Policy @40 yrs | Net Profit Invested @ 7% over same 40 yrs | Total Profit |
|---|---|---|---|---|---|---|---|---|
| Term $100,000 | $31,853 | $142,330 | $174,183 | $100,000 | $74,183 | N/A | $1,210,029 | $1,210,029 |
| Legacy $100,000 | $28,603 | $127,809 | $156,412 | $50,000 + CV | $56,412 | $815,571 | $920,159 | $1,735,730 |

Table 3 shows another implementation where the benefit paid by the legacy life insurance policy to beneficiary 1 is a 20-year annuity. In accordance with implementations, the death benefit may be paid as an annuity in-part and a life insurance policy in-part. Increasing the premium payment may increase the amounts paid out in the annuity and/or increase the life insurance policy coverage limit.

TABLE 3

| Policy | Premium | Beneficiary 1 | Beneficiary 2 |
|---|---|---|---|
| Term $100,000 | $66.36 | $50,000 | $50,000 |
| Legacy $100,000 | $75.00 | 20 Year Annuity | $50,000 |

Figure 2:
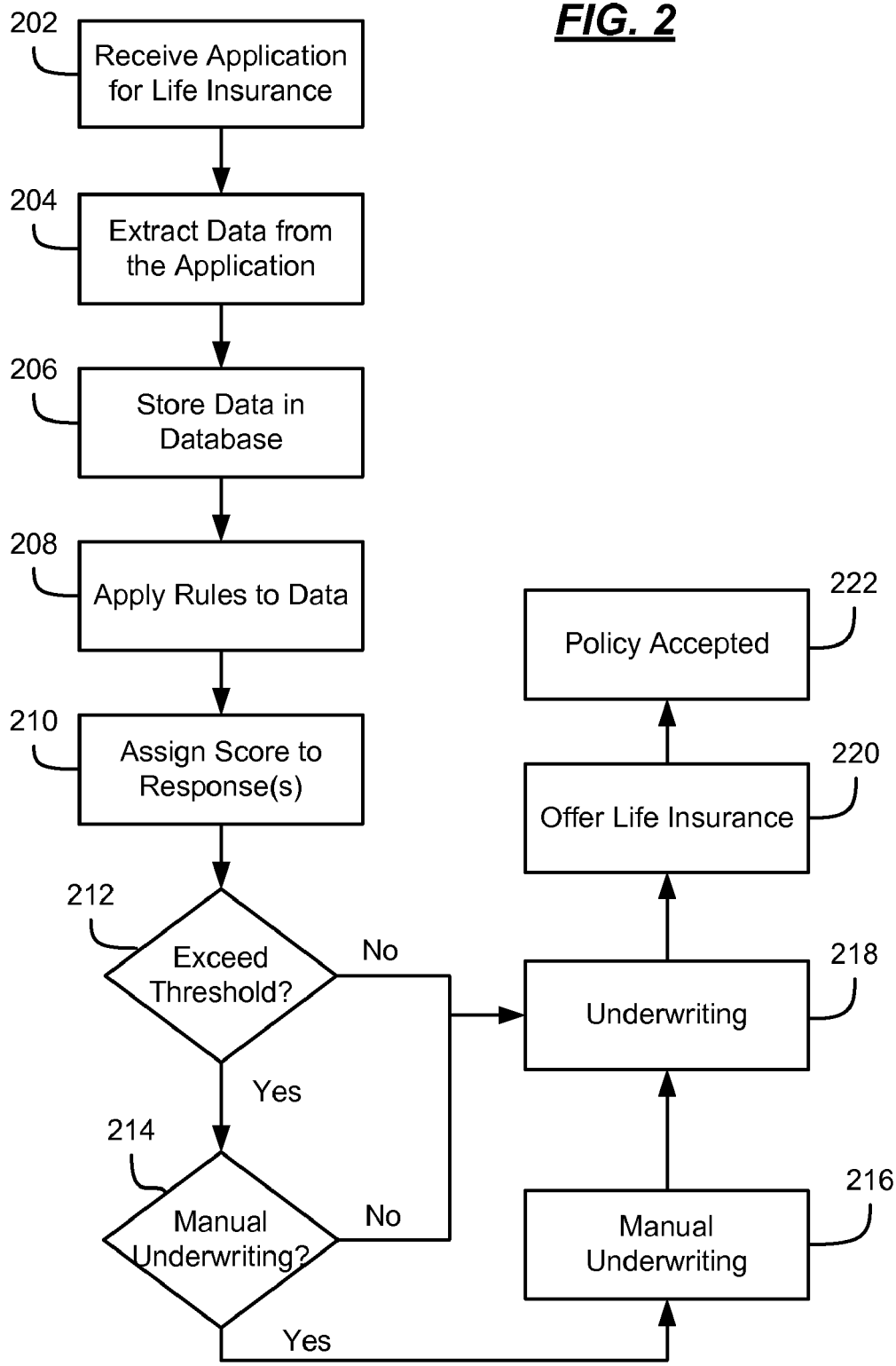
FIG. 2 is a example operational flow of the processes of providing a life insurance product to an applicant.

FIG. 2 is an example operational flow 200 of the processes of providing a life insurance product to an applicant. At 202, an application for life insurance is received. The application may be filled out by an applicant on-line, on paper, by e-mail or other electronic communication, or over the telephone with the assistance of a representative. The application may request the information noted above regarding the applicant's age, health, activities, occupation, marital status, etc. The application may include a preliminary indication of a desired insurance product under which the applicant would like to be covered. At 204, data may be extracted from the application, and at 206, the data is stored in a database. For example, answers provided by the applicant may be extracted and stored in the application database 173.

At 208, rules may be applied to the extracted application data from the life insurance application. For example, the rules may define acceptable answers/ranges to any question of any type or category that may used in connection with a determination of an applicant's acceptability for a life insurance policy of a particular risk class. The rules may define when a particular applicant characteristic may be outside of a predetermined threshold, and in such a situation, several applicant characteristics may be analyzed to yield a more accurate risk determination. In some implementations, the insurance provider may provide rules that alter thresholds based on the applicant selection of the legacy life product. For example, the insurance provider may accept a higher risk applicant based on the knowledge that a death benefit may be paid as a subsequent life insurance product that will remain with the insurance provider.

At 210, a score may be assigned to each response in the life insurance application. The score that is assigned may be created by the life insurance provider according to any number or type of criteria. For example, criteria for assigning a score may be determined according to profitability or actuarial statistics that have been created in connection with previous life insurance applications.

At 212, a determination is made as to whether a score for the particular life insurance characteristic exceeds a predetermined threshold. If so, then at 214 a determination is made as to whether manual underwriting is to be performed. If so, then at 216, manual underwriting is performed. As noted above, manual underwriting may be performed to as part of the manual processing 174 as certain aspects of the application may need further consideration and resolution by a human underwriter. If not, then at 218, an automated underwriting is performed. For example, the underwriting module 172 may evaluate the scores and make a determination of the risk associated with insuring the applicant. In addition, the underwriting module 172 may determine pricing associated with desired insurance product and may determine other insurance products that may be offered by the insurance provider to the applicant in accordance with the determined risk.

At 220, the offered policy terms are presented to the applicant. The terms may include the desired life insurance policy or alternative policies. The policy may be a term life insurance policy, a whole life insurance policy, a legacy life insurance policy (as noted above), etc. At 222, the offer is accepted and the policy issued to the applicant. The policy may name one or more beneficiaries, as may be noted by the applicant during the application process. In accordance with an implementation, the issued policy may be a legacy life insurance policy, as described above.

Figure 3:
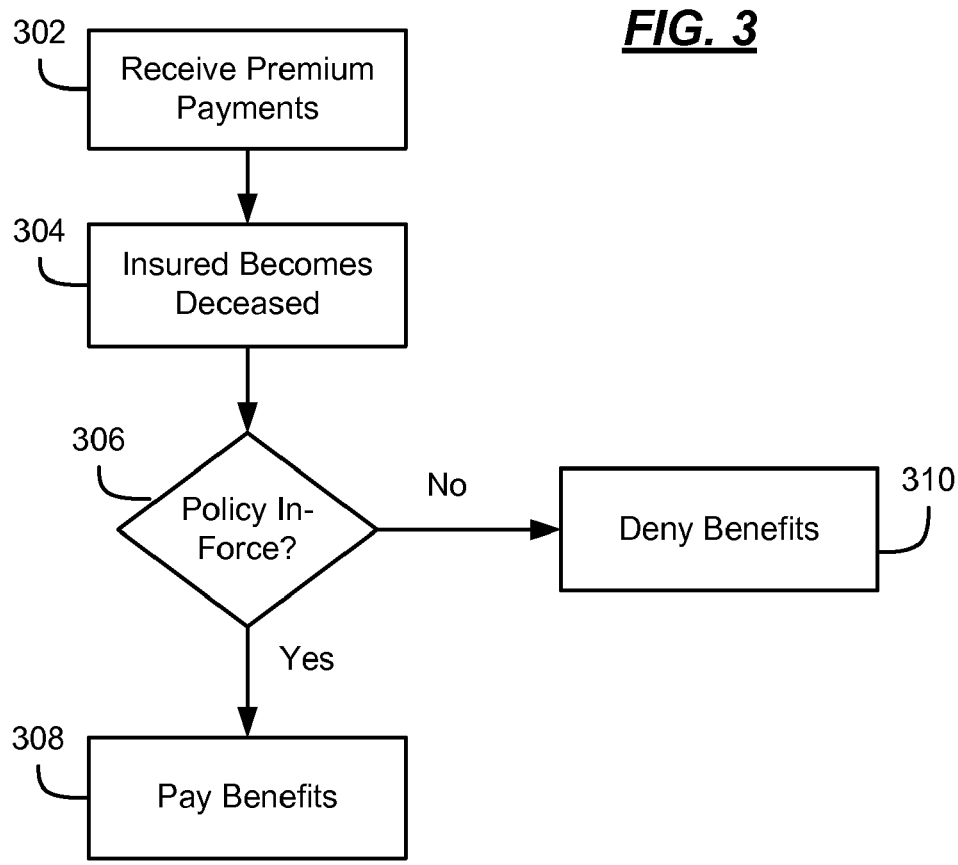
FIG. 3 illustrates an example operational flow of the process that may be performed during the life cycle of a legacy life insurance product.

FIG. 3 illustrates an example operational flow 300 of the process that may be performed during the life cycle of a legacy life insurance product. At 302, premium payments are received. The payments may be made at predetermined intervals (e.g., monthly, annually, semi-annually, quarterly, etc.). In accordance with the life insurance contract, the policy may remain in-force as long as premium payments are received.

At 304, the insured becomes deceased. At 306, it is determined if the policy remains in-force. For example, it is determined if premium payments have been made and are current, and if the term of the legacy life insurance policy has not lapsed.

At 308, if the policy is in-force, then death benefits may be paid to the beneficiaries at 310. The benefits may be cash payment, a life insurance policy, an annuity, or some other financial instrument in the name of one or more of the beneficiaries. The life insurance policy or annuity may be fully or partially funded by the death benefit. Otherwise, if the policy is not in-force, then at 312, death benefits are not paid.

Thus, the legacy life insurance product may provide a beneficiary with a cash payment and a life insurance product enabling an insured to be comforted that a named beneficiary will be financially secure, as well as providing life insurance or an annuity to protect those who depend on the beneficiary for financial support.

Figure 4:
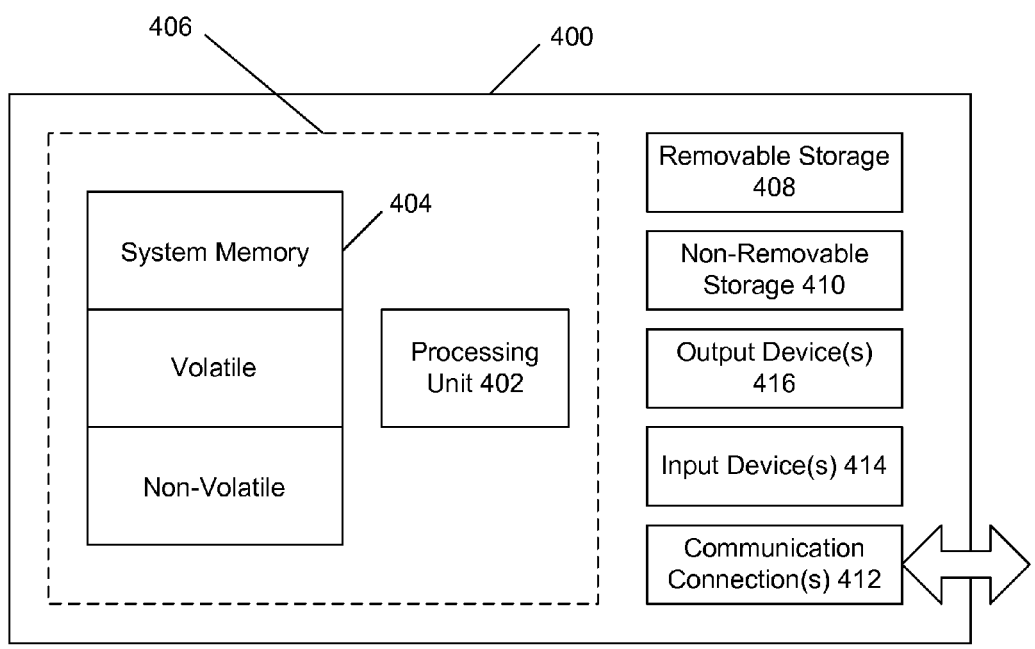
FIG. 4 illustrates an example computing environment in which aspects of the present disclosure may be implemented.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 404, removable storage 408, and non-removable storage 410 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium storing computer-readable instructions for providing a life insurance policy, the instructions, which when executed, cause a processor to perform:
   receiving application information from an application;
   underwriting the application in accordance with risk factors;
   augmenting the underwriting with a determination that the life insurance policy names at least one beneficiary that will receive a subsequent life insurance policy funded from a death benefit of the life insurance policy; and
   issuing the life insurance policy naming that at least one beneficiary that will receive the subsequent life insurance policy.

2. The non-transitory computer-readable medium of claim 1, further comprising instructions, which when executed, cause a processor to adjust a premium payment amount in accordance with the augmenting of the underwriting.

3. The non-transitory computer-readable medium of claim 2, wherein the premium payment amount is reduced.

4. The non-transitory computer-readable medium of claim 1, wherein at least one beneficiary receives a cash benefit in addition to the subsequent life insurance policy.

5. The non-transitory computer-readable medium of claim 1, wherein plural beneficiaries each receive a respective subsequent life insurance policy funded from the death benefit.

6. The non-transitory computer-readable medium of claim 1, wherein the insurance company issues the subsequent life insurance policy as a term life insurance policy.

7. The non-transitory computer-readable medium of claim 1, wherein the insurance company issues the subsequent life insurance policy naming at least one beneficiary that will receive a subsequent death benefit that includes a second subsequent life insurance policy.

8. A non-transitory computer-readable medium storing computer-readable instructions for providing a life insurance policy, the instructions, which when executed, cause a processor to perform:
   receiving information about an applicant for a first life insurance policy;
   receiving an identification of a beneficiary;
   stipulating death benefits for the beneficiary, the death benefits including in-part a provision of a subsequent life insurance policy;
   determining a premium associated with the first life insurance policy; and
   issuing the first life insurance policy to the applicant.

9. The non-transitory computer-readable medium of claim 8, further comprising instructions, which when executed, cause a processor to adjust a premium payment amount in accordance with the first policy paying the subsequent life insurance policy to the beneficiary.

10. The non-transitory computer-readable medium of claim 9, wherein the premium payment amount is reduced.

11. The non-transitory computer-readable medium of claim 8, wherein the beneficiary receives a cash benefit in addition to the subsequent life insurance policy.

12. The non-transitory computer-readable medium of claim 8, wherein the beneficiary names a second beneficiary of the subsequent life insurance policy, the second beneficiary receiving a second subsequent life insurance policy when the beneficiary becomes deceased.

13. The non-transitory computer-readable medium of claim 8, wherein the subsequent life insurance policy is fully funded by a death benefit of the first insurance policy.

14. The non-transitory computer-readable medium of claim 8, wherein the insurance company issues the subsequent life insurance policy from the death benefit.

* * * * *